H. J. MASSON.
METHOD OF MANUFACTURING CARBON BLACK, LAMPBLACK, AND HYDROGEN.
APPLICATION FILED JULY 17, 1920.
1,418,385.  
Patented June 6, 1922.
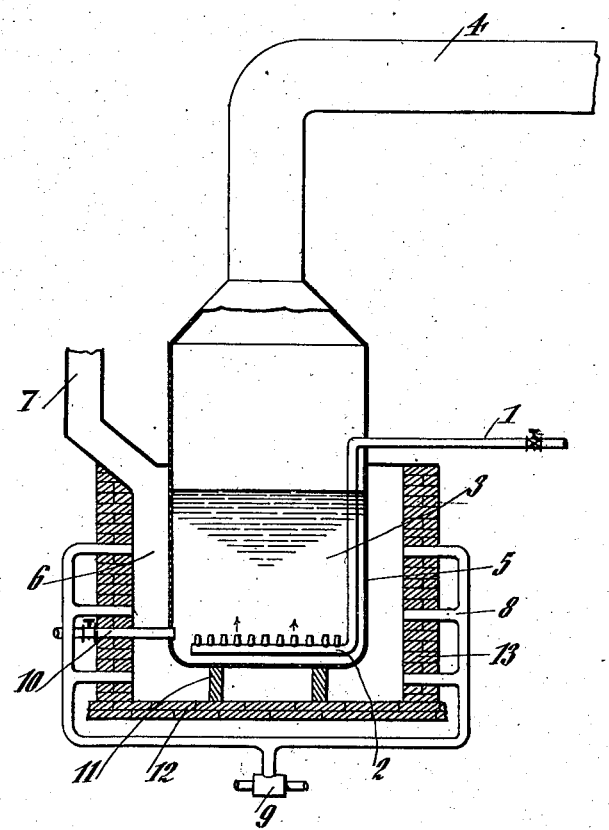
INVENTOR  
Henry J. Masson  
BY  
ATTORNEYS

UNITED STATES PATENT OFFICE.

HENRY JAMES MASSON, OF NEW YORK, N. Y., ASSIGNOR TO JULIAN M. GERARD, OF NEW YORK, N. Y.

METHOD OF MANUFACTURING CARBON BLACK, LAMPBLACK, AND HYDROGEN.

1,418,385.  Specification of Letters Patent.  Patented June 6, 1922.

Application filed July 17, 1920. Serial No. 396,984.

*To all whom it may concern:*

Be it known that I, HENRY J. MASSON, a citizen of the United States, residing at New York, in the county of New York and State of New York, have invented certain new and useful Improvements in a Method of Manufacturing Carbon Black, Lampblack, and Hydrogen, of which the following is a specification.

My invention relates to new and useful improvements in a method for manufacturing carbon black, lampblack and hydrogen.

One of the objects of my invention is to produce carbon black, lampblack and hydrogen from natural gas or other hydrocarbon gases and also from hydrocarbon liquids and other carbon-containing substances which may be converted to gas or vapor.

Another object of my invention is to produce the substances before named, economically and in large quantities without the use of complicated and expensive equipment.

The process usually employed for the commercial manufacture of carbon black or lampblack from natural gas, for example, is to burn the said gas with an insufficient supply of air so as to produce a sooty or smoky flame which is allowed to impinge upon a cool collecting surface or surfaces such as a large iron plate or the like.

Such a method is very wasteful as the yield is only about three per cent of the theoretical maximum yield.

In order to increase the yield of carbon and at the same time collect the hydrogen resulting from the decomposition of the substances treated, attempts have been made to decompose the gases by subjecting them to a high temperature, as for example, by passing them through highly heated tubes. Owing, however, to the impossibility of securing material for the said tubes which will be highly refractory, will be capable of withstanding the strains due to expansion and contraction without having very heavy walls, which will be a good conductor of heat and at the same time effectively resist the decomposing action of carbon and hydrogen at very high temperatures. None of these processes have proved commercially practical.

In addition, these processes could not be made continuous because the carbon gradually deposited upon the inner walls of these tubes, which made it necessary to burn out these carbon deposits by means of air or scrape them out. Where the decomposition was effected in large towers by contact with highly heated material, the said material which caused the decomposition, had to be periodically reheated to a high temperature during which time the process had to be interrupted.

My new and improved method consists in passing gas or vapor containing a hydrocarbon in the absence of air in the finely divided state through a bath made of molten metal, a molten alloy, or suitable non-metallic substances which are maintained in a liquid state at a suitable temperature. Some of the substances which could be used in the bath are magesium, copper, silver, nickel and various kind of slags and the like. By this method the carbon containing substance is instantly decomposed forming hydrogen and carbon, the carbon being formed in a state of very fine subdivision. The hydrogen bubbles out of the molten bath carrying the fine particles of carbon with it, and the very minute particles of carbon are then precipitated and separated from the hydrogen by any suitable means such as are shown, for example, in U. S. Patent No. 1,278,137. Any suitable substance containing carbon is to be considered as an equivalent for a hydrocarbon, and to be included whenever the term "hydrocarbon" is used. Of course a volatile liquid hydrocarbon would be an equivalent for an aeriform hydrocarbon, if used in this process.

One of the forms of apparatus with which my method can be carried out is shown in the drawing, this being partially in elevation and partially in section.

A cylindrical vessel 5 constructed of highly refractory material such as iron or steel or any material commonly used for making crucibles is supported upon a suitable base 11, which rests on a solid foundation 12. The cylindrical pot or vessel 5 is enclosed in a refractory brick setting 13, being separated therefrom by the space 6.

The pot 5 is filled to a suitable height as shown in the drawing with the material to be melted. If necessary this material may be removed from the pot by means of an outlet pipe 10 having a suitable valve. The pot and the material contained therein are kept at a sufficiently high temperature, preferably above 2000° F. by any suitable heating means. I prefer to use a molten copper bath, having a depth of about three feet.

A combustible mixture of air and gas are introduced by means of the valve *g* through the manifold 8 to the various burners leading from the manifold 8 and which are arranged around the sides of the space or the combustion chamber 6. The burning gases enter the combustion chamber tangentially and whirl around the pot producing uniform heat.

The gas or vapor containing the carbon enters the pot by means of pipe 1. This gas or vapor is preheated as it passes below the level of the molten material and indeed before this time, since the pipe 1 is heated by conduction. The vapor and gas bubbles up from the bottom 2 of the pipe 1 through the nipples there shown.

The minute bubbles come into contact with the molten material so that the gas or vapor is decomposed into carbon and hydrogen. The hydrogen bubbles up from the molten material and the hydrogen and carbon pass out through the flue 4 to any suitable device for collecting the carbon.

The vertical branch of the flue 4 is made so high that any molten material which may spatter upwardly falls back into the bath.

At the beginning of the operation, the region above the bath may contain air, but this is speedily displaced by the hydrogen produced, so that the particles of carbon pass up through the precipitator through an inert atmosphere of hydrogen.

The flue 4 is made of sufficient length so that the hydrogen and carbon are cooled before being passed through the precipitator to a temperature of about 250° F. so that the carbon is not collected while it is too hot, as it is desirable that the particles of carbon should not stick together, forming lumps. The material which is melted in the pot 5 to form the bath should not react with the carbon and the hydrogen to form a carbide or hydride which shall be stable at the high temperatures used, and it is preferable that it should not react with sulphur to form a permanent sulphide, as small quantities of sulphur may sometimes be present in the hydrocarbon.

For example, magnesium forms a carbide but this is decomposed into carbon and magnesium at the high temperatures employed, so that the magnesium has a catalytic action, first combining with the carbon to form a carbide and then having this carbide decompose to free the carbon in the minute particles desired. Other metals may be employed which have a catalytic action.

One of the important elements of my invention is that the aeriform liquid to be decomposed is allowed to bubble upwardly freely, and to freely escape from the surface of the molten material. By introducing the aeriform fluid under suitable pressure, and by allowing the minute particles of carbon to be forced with considerable velocity through and out of the body of molten material, particles are secured in the current of hydrogen above the molten material which are suitable for use as lampblack or carbon black. It must be remembered that lampblack or carbon black must consist of very minute particles of carbon free from all adherence to each other or else the material is useless for the purpose for which lampblack or carbon black is to be intended.

As can be seen in the drawing, the walls enclosing the molten material are vertical for a considerable height, so that the ascending hydrogen and carbon particles are cooled without substantial contact with these walls.

If desired, the walls of the vessel 5 above the level of the molten material and in particular, the walls of the vertical branch of the flue 4 could be made to diverge from each other, so as to facilitate the cooling of the hydrogen and carbon particles, without allowing the carbon particles to contact with surfaces to which they might cling and form an undesirable deposit.

If desired, the vertical branch of the flue 4 could be artificially cooled by any suitable means which need no description as such means are well known and form no part of my invention in and of themselves.

To secure lampblack, it is desirable to use a temperature below 2000° F., a temperature of about 1500° F., being suitable. Of course, a metal having a lower melting point than copper would then be used. It is desirable that the carbon formed by the deposition should be removed from the bath as quickly as possible to secure the softest and finest grade of lampblack and carbon black.

Of course, the gas or vapor which passes through it should be forced in at a suitable pressure which will depend upon the height of the molten bath and the material used therein. The metal may be agitated in the bath by any suitable means while the operation is going on.

The hydrogen may be collected and utilized in various ways. For example, it may be used to heat the pot 5 so as to maintain the bath liquid.

I have described a preferred embodiment of my invention, but it is clear that numerous changes and omissions could be made in details without deparing from its spirit.

I claim:—

1. A method of making lampblack, carbon black and the like which consists in causing a carbon containing substance in the form of minute separate bodies to contact with material heated sufficiently high to produce minute particles of carbon, and removing the carbon thus formed from said heated material with sufficient rapidity to maintain the black color and the softness of the carbon produced.

2. A method of making lampblack, carbon black and the like which consists in causing a finely divided carbon containing substance to contact with a heated catalytic substance so as to form the carbide of the said substance, the temperature of the reaction being sufficiently high to cause the instantaneous decomposition of the carbide so formed, and carrying away the carbon resulting from the decomposition of the said carbide in finely divided and separate particles in a current of inert gas.

3. A method of decomposing a carbon containing substance which consists in passing it through a body of molten material, the temperature of which is at least substantially 2000° F. so as to decompose said substance into minute particles of carbon and hydrogen and rapidly removing the carbon thus formed from said molten material.

4. A method of decomposing a carbon containing substance to produce lampblack, carbon black and the like which consists in passing it through a body of catalytic molten material, the temperature of which is sufficiently high to decompose said substance into minute particles of carbon and hydrogen and removing the carbon thus formed from said molten material with sufficient rapidity to maintain the black color and softness of the carbon produced.

5. A method of making lampblack, and the like, which consists in forcing a current of aeriform hydrocarbon, under pressure through a bath of molten material, the said molten material being maintained at sufficiently high temperature to decompose the said hydrocarbon, into carbon and hydrogen, the said aeriform fluid being forced through the said molten material with sufficient pressure to carry along with the carbon resulting from the decomposition in the form of minute and separate particles.

6. A method of making lampblack, carbon black and the like, which consists in forcing a current of aeriform hydrocarbon under pressure through a bath of molten material, the said molten material being maintained at sufficiently high temperature to decompose the said hydrocarbon into carbon and hydrogen, the said aeriform fluid being forced through the said molten material with sufficient pressure to carry along with it the carbon resulting from the decomposition in the form of minute and separate particles, the said aeriform fluid being allowed to freely bubble through the molten material and freely escape therefrom, so that the minute particles of carbon formed may be allowed to cool without substantial contact with surfaces on which they may deposit.

In testimony whereof I hereunto affix my signature.

HENRY JAMES MASSON.